US012808493B2

(12) United States Patent
Shanahan et al.

(10) Patent No.: US 12,808,493 B2
(45) Date of Patent: Nov. 24, 2026

(54) TACTICAL CHEMICAL LIGHT STICK DISPENSER

(71) Applicant: Carolina Clovis LLC, Southern Pines, NC (US)

(72) Inventors: Christopher Reid Shanahan, Southern Pines, NC (US); Riley Jason Boland, Bragg Creek (CA)

(73) Assignee: Carolina Clovis LLC, Southern Pines, NC (US)

( * ) Notice: Subject to any disclaimer, the term of this patent is extended or adjusted under 35 U.S.C. 154(b) by 0 days.

(21) Appl. No.: 19/226,615

(22) Filed: Jun. 3, 2025

(65) Prior Publication Data

US 2025/0290607 A1 Sep. 18, 2025

Related U.S. Application Data

(63) Continuation-in-part of application No. 19/046,671, filed on Feb. 6, 2025, which is a continuation of application No. 18/159,926, filed on Jan. 26, 2023, now Pat. No. 12,247,708.

(60) Provisional application No. 63/303,300, filed on Jan. 26, 2022.

(51) Int. Cl.
*B65D 83/02* (2006.01)
*F21K 2/06* (2006.01)

(52) U.S. Cl.
CPC ................ *F21K 2/06* (2013.01); *B65D 83/02* (2013.01)

(58) Field of Classification Search
CPC ...................................................... B65D 83/02
See application file for complete search history.

(56) References Cited

U.S. PATENT DOCUMENTS 5,328,052 A * 7/1994 Kizilos .................. A47F 1/085 221/231
7,200,964 B2 * 4/2007 Gates ........................ F41A 9/67 89/197
9,738,433 B2 * 8/2017 Hogg .................. H01M 50/264
10,577,197 B1 * 3/2020 Burnsed, Jr. ........... B65G 59/02
12,247,708 B2 * 3/2025 Shanahan .............. B65D 83/02
2007/0034640 A1 * 2/2007 Casale .................. B43M 15/00 221/232
2015/0160186 A1 * 6/2015 Garner-Richards ......................... A61B 5/150503 221/270

* cited by examiner

*Primary Examiner* — Gene O Crawford
*Assistant Examiner* — Ayodeji H Ojofeitimi
(74) *Attorney, Agent, or Firm* — Martin S. High, P.C.

(57) ABSTRACT

A tactical chemical light stick dispenser to provide the ability of a user to quickly and accurately deploy chemical light stick devices from a contained and protected chemical light stick housing device. The tactical chemical light stick dispenser employs chemical lights sticks that give off just the right amount of light necessary to effectively mark an area of concern or identified without the need for larger chemical light sticks as seen in traditional bundles.

11 Claims, 16 Drawing Sheets

TACTICAL CHEMICAL LIGHT STICK DISPENSER

STATEMENT REGARDING FEDERALLY SPONSORED RESEARCH OR DEVELOPMENT

Not applicable

BACKGROUND OF THE EMBODIMENTS

Field of the Embodiments

The general field of the embodiments of the Tactical Chemical Light Stick Dispenser is the dispensing of chemical lighting devices. More specifically, the field of the embodiments of the Tactical Chemical Light Stick Dispenser is dispensing of chemical lighting devices under law enforcement and similar tactical conditions.

Current law enforcement tacticians trained in close quarters use chemical light sticks to mark rooms or spaces as visited or identified as they progress room by room in low-light conditions. Chemical light sticks are used by virtually all law enforcement entities that clear rooms and buildings by force against known threats. Current conditions call for use of "chemlight bundles." These bundles consist of four to ten 4"-6" chemical light sticks that are tied together and each potentially covered with tape to reduce the light signature. When needed, the user reaches down to the bundle on his kit, grabs one, and pulls or rips it off the bundle loop or string, breaks it with two hands, and drops it on the ground in or near the identified room.

Chemical light stick bundles are time consuming to create as a single bundle can take a few minutes to create. The materials needed include four to ten chemical light sticks, a roll of tape, 12" of cordage, and possibly a lighter to burn ends of cord once cut and tied. The bundles leave exposed chemical light sticks dangling from an attachment loop and can inadvertently break when a tactician climbs over obstacles. A mistakenly broken chemical light stick then illuminates the individual at night and draws attention from perpetrators and that is unacceptable. The bundles are bulky and 4"-6" light sticks are simply overkill when it comes to simply marking a room visited or identified. When not taped, a fully illuminated 4" chemical light stick can illuminate an entire room and all the officers within. Too much light will cause tacticians to lose advantage under night vision. Using bundles can take a few seconds too long to rip off a chemical light stick, break it, and drop it on the ground to mark a room visited or identified. In certain tactical situations, seconds matter and lives may be lost because of expended time.

SUMMARY OF THE EMBODIMENTS

The objective of the embodiments of the Tactical Chemical Light Stick Dispenser is to provide the ability of a user to quickly and accurately deploy chemical light stick devices.

A purpose of the Tactical Chemical Light Stick Dispenser is to eliminate chemical light stick bundles and provide an efficient means of dispensing chemical light sticks. The Tactical Chemical Light Stick Dispenser uses chemical light sticks that give off just the right amount of light necessary to effectively mark a room visited or identified without the need for taping each larger chemical light stick as seen in traditional bundles.

There has thus been outlined, rather broadly, the more important features of the embodiments in order that the detailed description thereof that follows may be better understood, and in order that the present contribution to the art may be better appreciated. There are, of course, additional features of the embodiments that will be described hereinafter and which will form the subject matter of the claims appended hereto.

In this respect, before explaining at least one embodiment of the embodiments in detail, it is to be understood that the embodiment is not limited in this application to the details of construction and to the arrangements of the components set forth in the following description or illustrated in the drawings. The embodiment or embodiments are capable of other embodiments and of being practiced and carried out in various ways. Also, it is to be understood that the phraseology and terminology employed herein are for description and should not be regarded as limiting. As such, those skilled in the art will appreciate that the conception, upon which this disclosure is based, may readily be used as a basis for the designing of other structures, methods, and systems for carrying out the several purposes of the embodiments. Additional benefits and advantages of the embodiments will become apparent in those skilled in the art to which the present embodiments relate from the subsequent description of the preferred embodiment and the appended claims, taken in conjunction with the accompanying drawings. It is important, therefore, that the claims be regarded as including such equivalent constructions insofar as they do not depart from the spirit and scope of the embodiments.

Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application. The abstract is neither intended to define the embodiments of the application, which is measured by the claims, nor is it intended to be limiting as to the scope of the embodiments in any way.

DETAILED DESCRIPTION OF THE PREFERRED EMBODIMENTS

Figures 1A, 1B:
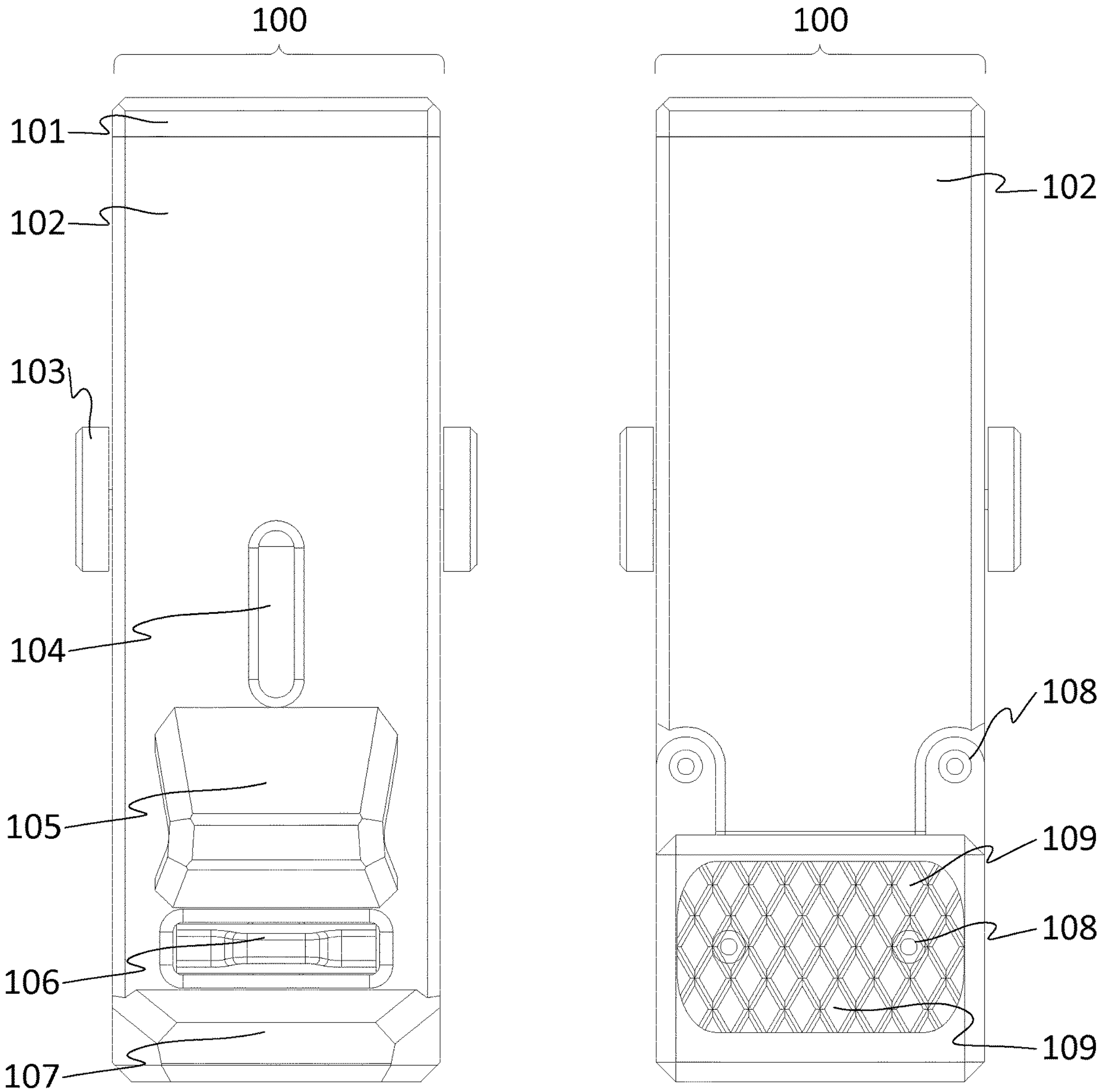
FIG. 1A is a front view of an embodiment of the Tactical Chemical Light Stick Dispenser.
FIG. 1B is a back view of an embodiment of the Tactical Chemical Light Stick Dispenser.
Figure 2A:
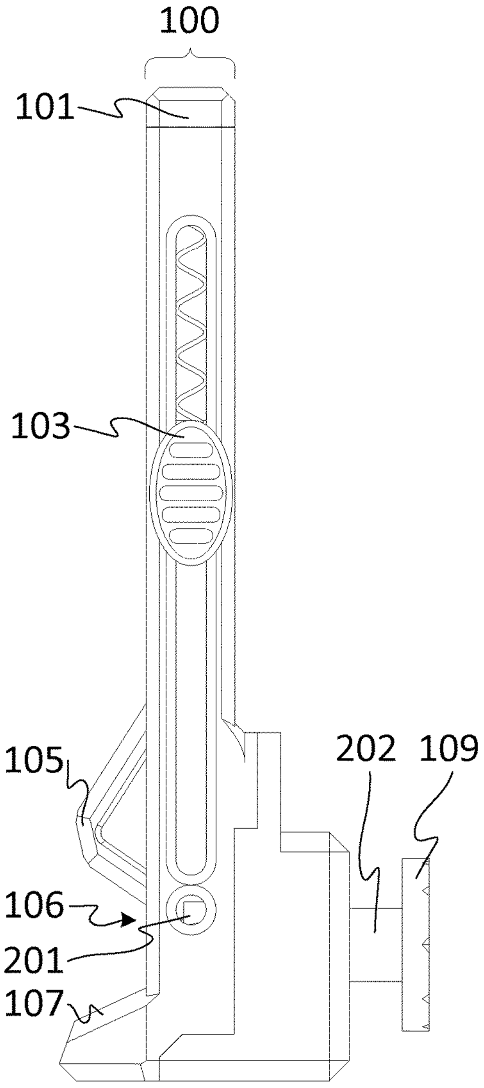
FIG. 2A is a left view of an embodiment of the Tactical Chemical Light Stick Dispenser.
Figure 2B:
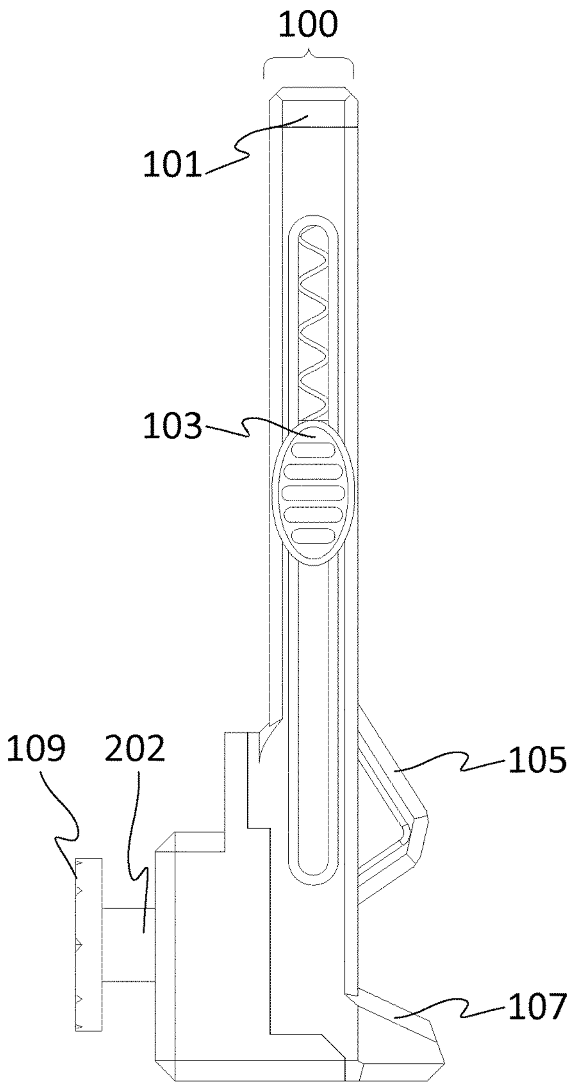
FIG. 2B is a right view of an embodiment of the Tactical Chemical Light Stick Dispenser.
Figure 3A:
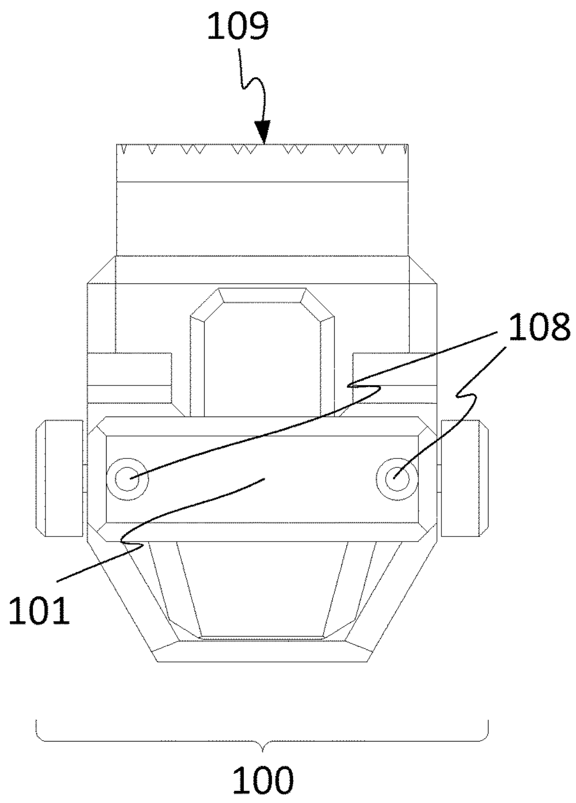
FIG. 3A is a top view of an embodiment of the Tactical Chemical Light Stick Dispenser.
Figure 3B:
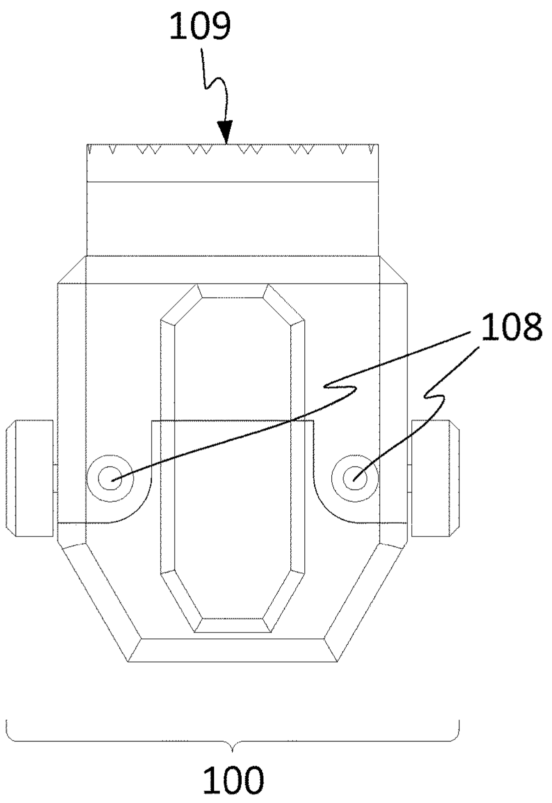
FIG. 3B is a bottom view of an embodiment of the Tactical Chemical Light Stick Dispenser.
Figure 4:
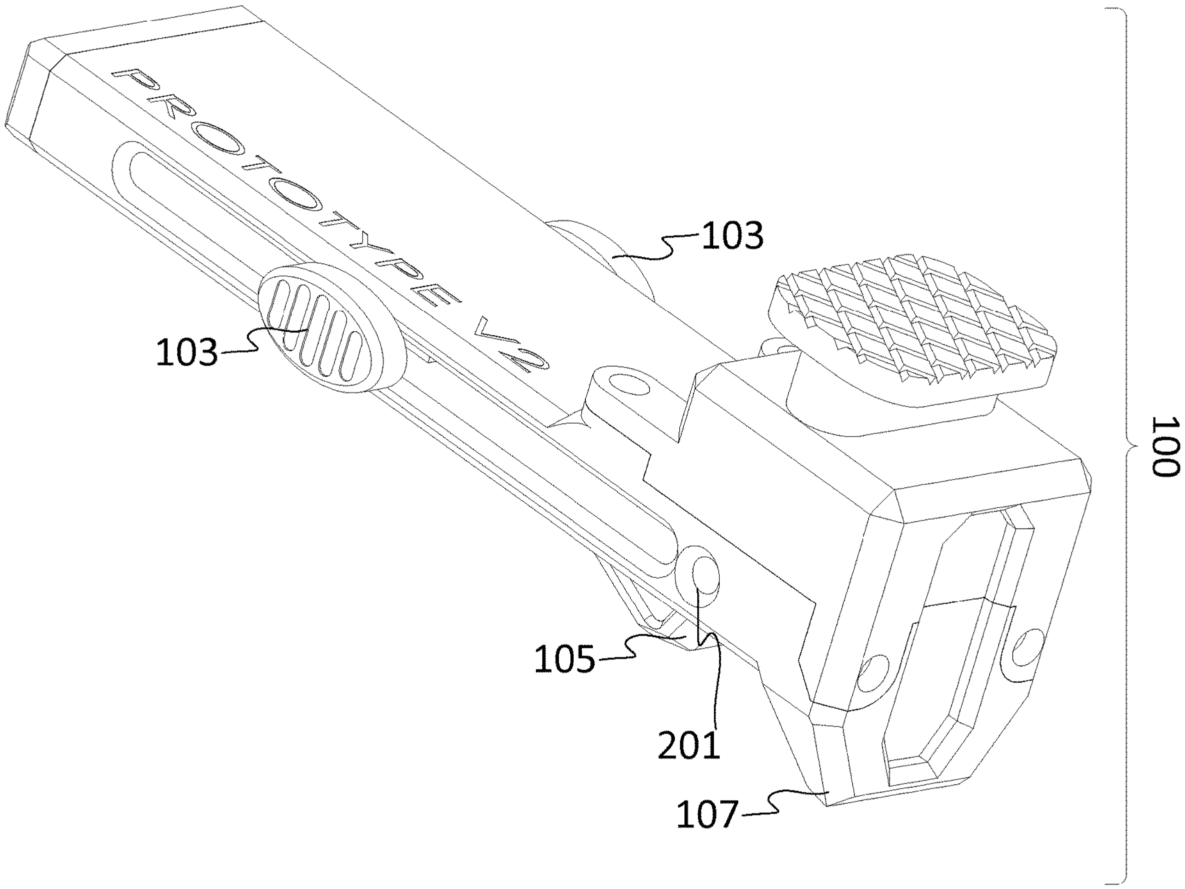
FIG. 4 is a perspective view of an embodiment of the Tactical Chemical Light Stick Dispenser.
Figure 5A:
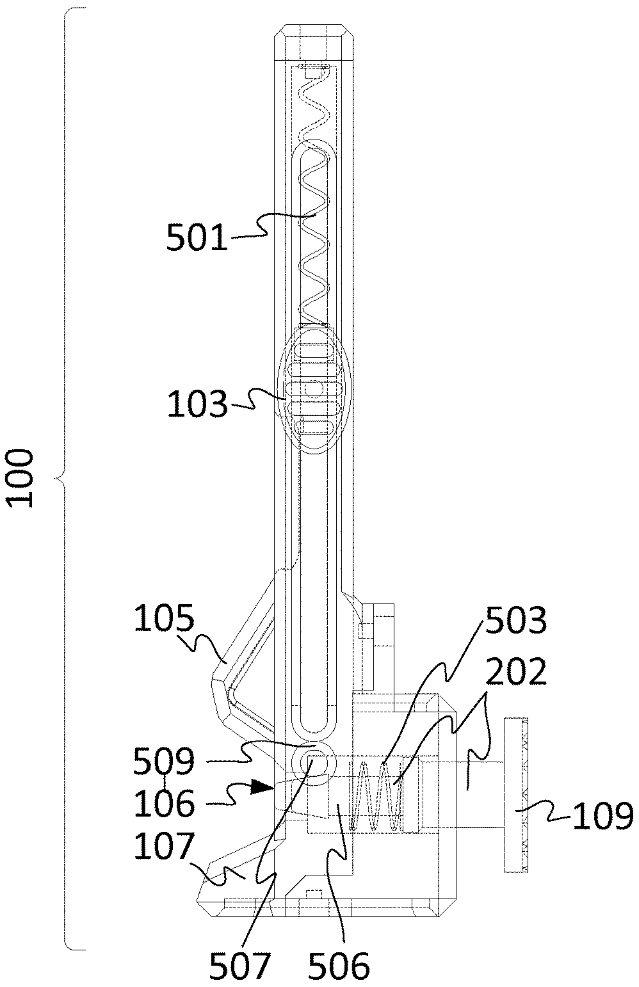
FIG. 5A is a left view of an embodiment of the Tactical Chemical Light Stick Dispenser showing the internal structure.
Figure 5B:
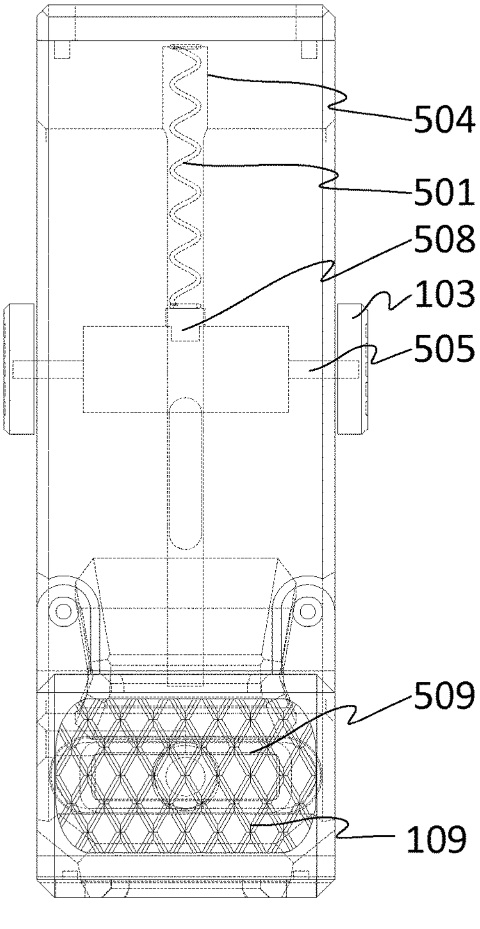
FIG. 5B is a back view of an embodiment of the Tactical Chemical Light Stick Dispenser showing the internal structure.
Figures 6A, 6B:
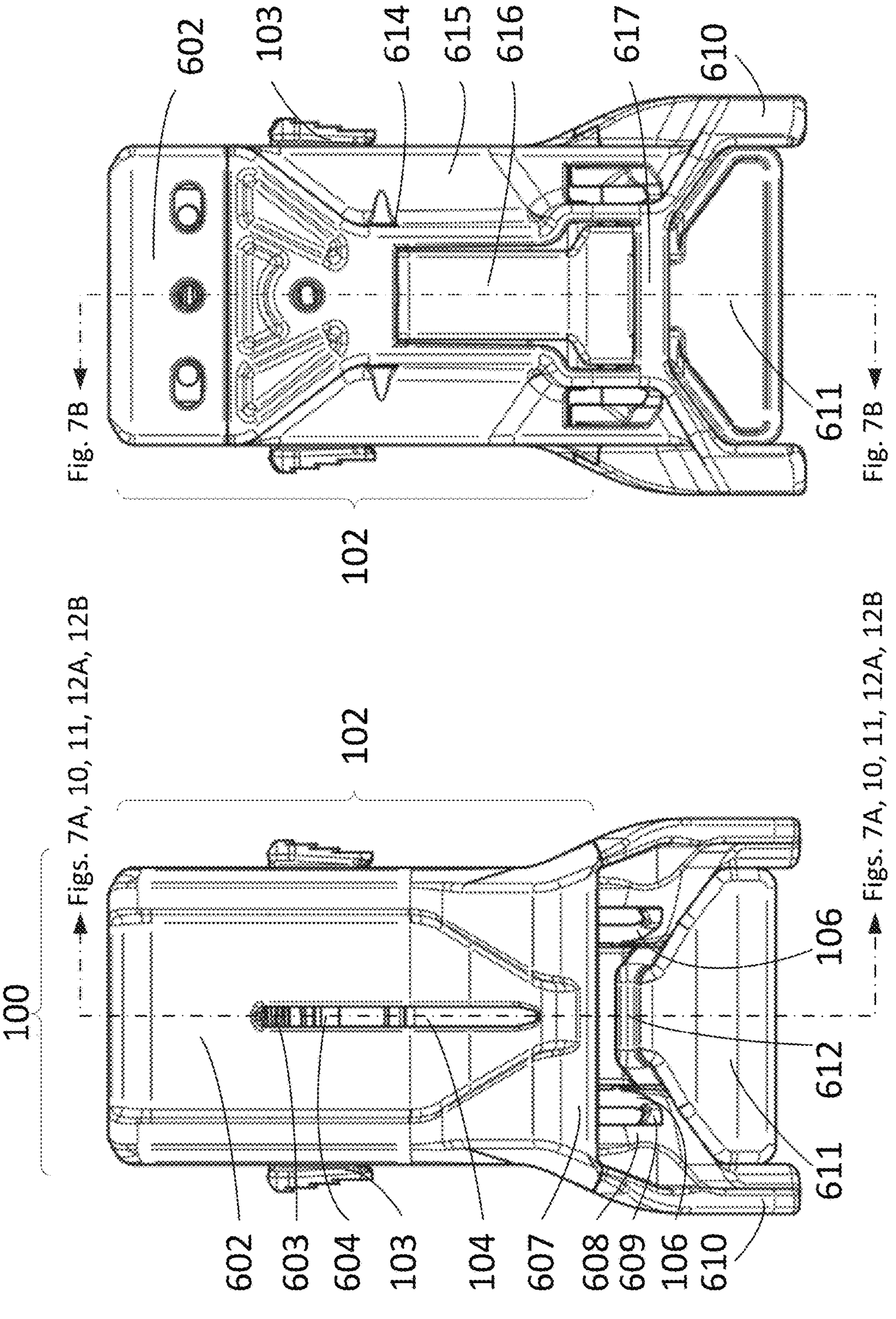
FIG. 6A is a front view of an embodiment of the Tactical Chemical Light Stick Dispenser.
FIG. 6B is a rear view of an embodiment of the Tactical Chemical Light Stick Dispenser.
Figure 7A:
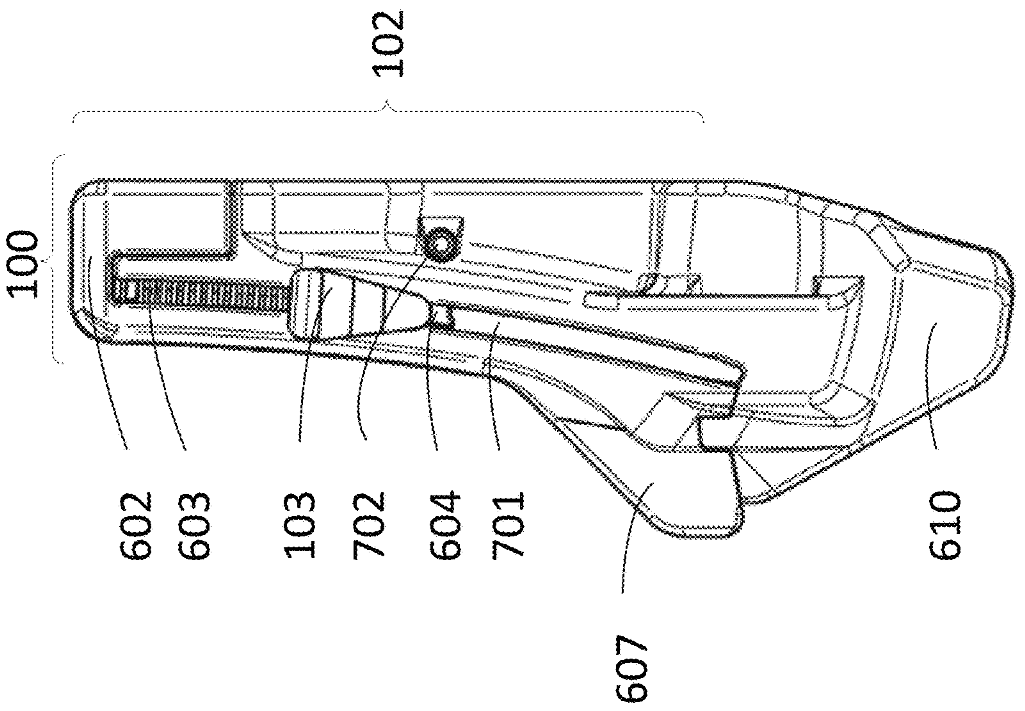
FIG. 7A is a right view of an embodiment of the Tactical Chemical Light Stick Dispenser.
Figure 7B:
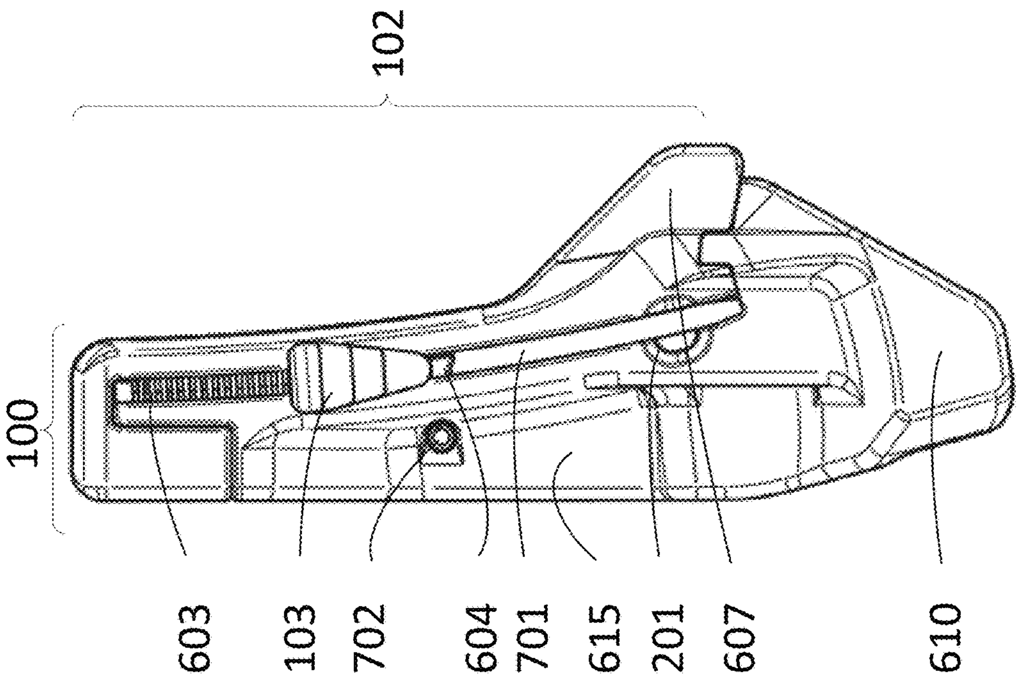
FIG. 7B is a left view of an embodiment of the Tactical Chemical Light Stick Dispenser.
Figure 8B:
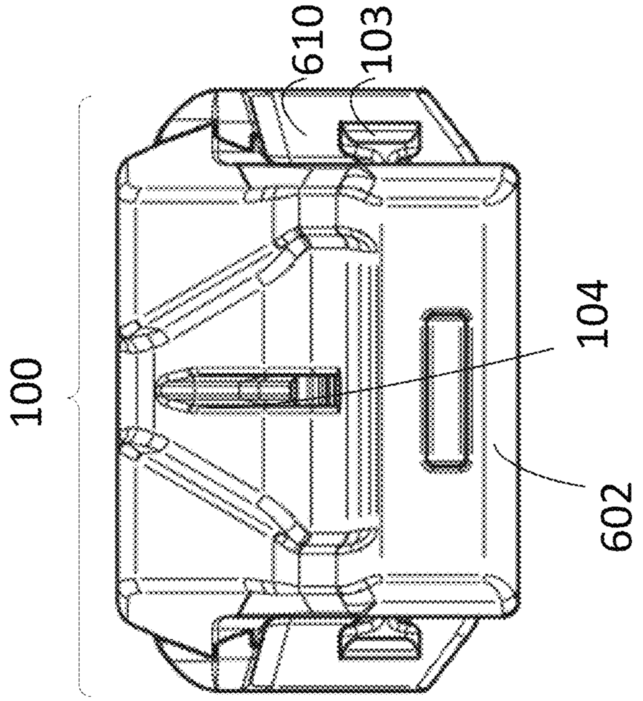
FIG. 8B is a top view of an embodiment of the Tactical Chemical Light Stick Dispenser.
Figure 8A:
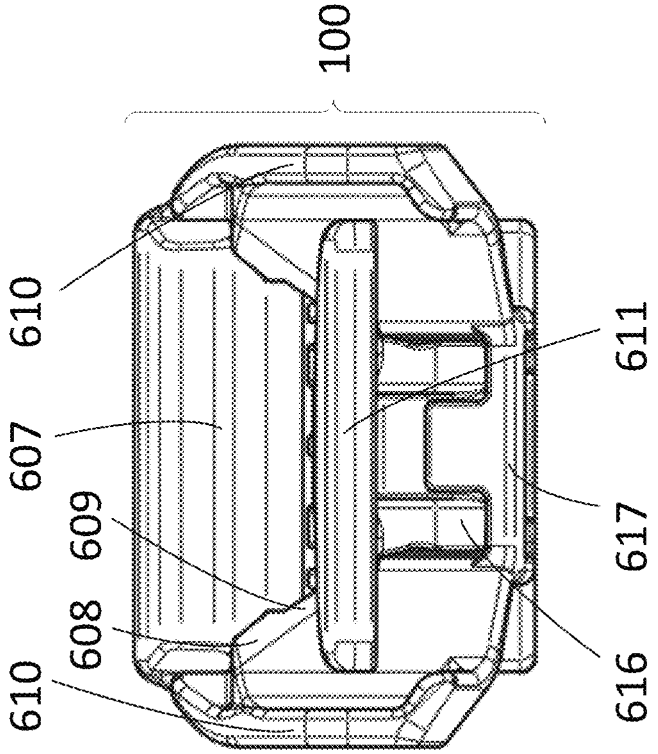
FIG. 8A is a bottom view of an embodiment of the Tactical Chemical Light Stick Dispenser.
Figure 9:
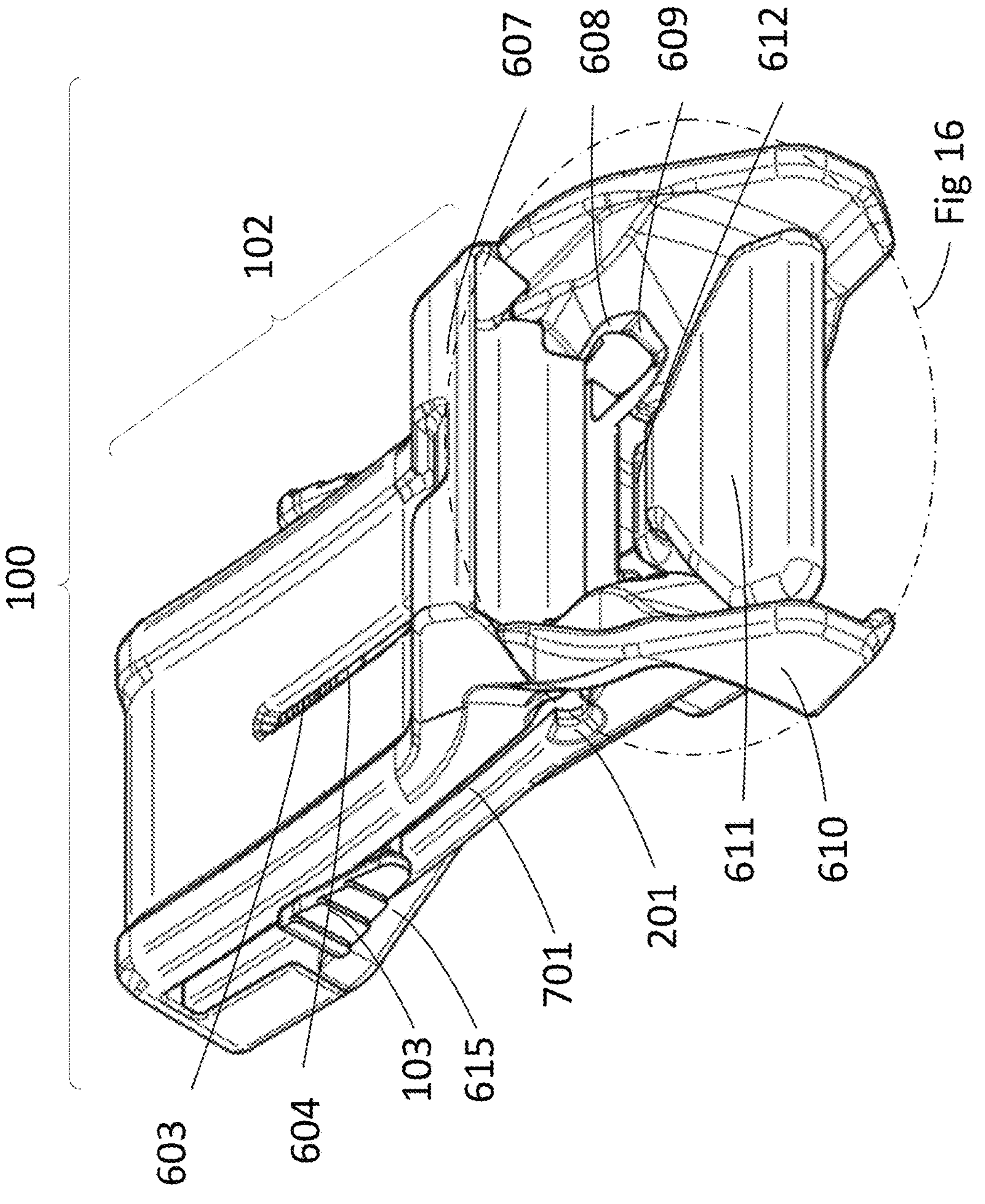
FIG. 9 is a perspective view of an embodiment of the Tactical Chemical Light Stick Dispenser.

Embodiments of the Tactical Chemical Light Stick Dispenser 100 (hereinafter "Dispenser") comprises a dispenser housing 102. The dispenser housing 102 comprises a light stick housing cover 101, loading index points 103 that are connected to an assist rod 505, a light stick status window 104, an upper raised finger block 105, a light stick ejection port 106, a lower raised finger block 107, a plurality of screws 108, an actuating button 109, and a chemical light stick housing loading port 201. The actuating button 109 is mechanically connected to one or two actuating plunger 202 which are in turn mechanically connected to an actuating rod 506. If there is one actuating plunger, one actuating rod tension spring 503 maintains pressure against the one actuating plunger 202 outward from the device and returns the actuating button 109 to the normal ready extended position. If there are two actuating plungers, two actuating rod tension springs 503 maintain pressure against the two actuating plungers 202 outwards from the device and returns the actuating button 109 to the normal ready extended position.

The actuating button 109 is mechanically connected to two actuating plungers 202 located on each side of the actuating button 109. The actuating button 109 connects and transitions into the actuating rod 506. When the actuating button 109 is depressed, the two actuating rod tension springs 503 are compressed and forces the actuating rod 506 towards the bottom most chemical light stick 509 in the dispenser housing 102. One of each of the two actuating rod tension springs 503 is located on either side of the actuating button 109. Each of the two actuating plungers 202 connects and transitions to the actuating rod 506. The pressure from the actuating button 109, through the actuating rod 506, provides a perpendicular force to the middle of the bottom most chemical light stick 509 resulting in breaking the internal chemical chamber of the bottom most light stick 509 and activating the chemical light stick. The now activated bottom most chemical light stick 509 is ejected through the light stick ejection port 106 and falls away from the Dispenser 100.

The dispenser housing 102 comprises within the dispenser housing 102 a chemical light stick housing vertical spring chamber 504, chemical light stick housing vertical spring 501 a vertical spring follower 508, a chemical light stick housing loading port 201, and a chemical light stick loading assist rod 505. On one side of the dispenser housing 102, the dispenser housing 102 forms a light stick status window 104 that permits viewing of the number of remaining chemical light sticks for activation and ejection.

The chemical light stick housing vertical spring 501 maintains downward pressure on the vertical spring follower 508, which in turn, applies downward pressure on the chemical light sticks in the dispenser 100. This pressure from the chemical light stick housing vertical spring 501 holds the light sticks in place down the dispenser housing 102 all the way to the light stick ejection chamber 507. When the actuating button 109 is depressed, the inward pressure caused by the actuating rod springs also forces a chemical light stick to bend across the actuating rod 506 causing the chemical light stick to become broken and the chemicals in the light stick to become activated. The actuating button then forces the chemical light stick to eject from the light stick ejection chamber 507 and out through the light stick ejection port 106. The two actuating rod tension springs 503 then return the actuating button 109 back to the original ready position.

The chemical light stick loading assist rod 505 when retracted upward removes the downward spring force on the chemical light sticks and allows for additional chemical light sticks to be inserted into the dispenser housing through the chemical light stick housing loading port 201.

To use the Dispenser 100, the user retracts the chemical light stick housing vertical spring 501 by applying pressure with thumb and finger on the loading index points 103 placed on the ends of the loading assist rod 505. The user inserts a plurality of chemical light sticks into the chemical light stick housing loading port 201. In one embodiment, the Dispenser 100 can accommodate up to fifty (50) chemical light sticks. In another embodiment, the Dispenser 100 can accommodate up to ten (10) chemical light sticks. The Dispenser 100 is now loaded and ready for operation. In another embodiment, the Dispenser 100 can accommodate 1.5 inch chemical light sticks, although other sized light sticks can be accommodated by appropriately scaling the size of the Dispenser 100.

Next, the user simply applies pressure to the actuating button 109 until the bottom of the button 109 contacts the main body of the Dispenser 100. As this button is fully depressed, the Dispenser 100 bends a single chemical light stick, breaks and mixes its internal chemical components, and ejects the activated light stick from the light stick ejection chamber 507 and out through the light stick ejection port 106. The broken chemical light stick is instantly activated and falls to the ground. When the user releases pressure from the actuating button 109 and allows it to reset to the original position, the chemical light stick housing vertical spring 501, with vertical spring follower 508, applies the necessary downward pressure which pushes and cycles the next chemical light stick into the bottom most position for subsequent activation and ejection.

The Dispenser 100 is reloadable during non-tactical pauses. The Dispenser 100 with ten to fifty chemical light sticks is less bulky than a bundle of 4" or 6" chemical light sticks. The Dispenser 100 can be manufactured from impact resistant polymeric material, so the Dispenser 100 is durable and will withstand the harsh elements of a tactical environment. The Dispenser 100 is extremely fast to activate, using only one hand. Importantly, the Dispenser 100 is lifesaving in nature, as it eliminates the possibility of an accidental broken chemical light hanging from the body of a law enforcement officer or similar occupation inside of a dangerous, tactical operation.

In another embodiment, the Dispenser 100 is comprised of a light stick housing 102, a light stick housing front cover 602, a light stick housing spring 603, a follower 604, left and right side loading index points 103, a light stick status window 104, an ejection port hood 607, left and right side light stick actuation retention walls 608, left and right side light stick housing retention walls 609, left and right side actuating lever guards 610, an actuating pull pad 611, an actuating plunger 612, the light stick ejection port 106, an actuating lever assembly rod channel 614, a light stick housing rear cover 615, an actuating lever 616, an actuating lever backstop 617, a follower alignment track 701, a light stick loading port 201, an actuating lever assembly rod 702, an actuating lever spring 1001, and a chemical light stick 1002.

In one embodiment the Dispenser 100 is comprised of the light stick housing 102, the light stick housing front cover 602 and the light stick housing rear cover 615 wherein the light stick housing spring 603 and the follower 604, is contained within the light stick housing 102, the light stick housing front cover 602 and the light stick housing rear cover 615. The follower 604 moves upwards and downwards within the follower alignment track 701.

The left and right side loading index points 103 and a light stick status window 104 allow for a quick inspection of the number of chemical light sticks 1002 loaded in the Dispenser 100. The ejection port hood 607 allows for the controlled ejection of the chemical light sticks 1002 into the hand of a user or to simply drop to the ground.

The left and right side light stick actuation retention walls 608 serve to secure the chemical light stick 1002 during actuation of the chemical light stick 1002. The left and right side light stick housing retention walls 609 serve to contain the bottom most light stick in the light stick housing, acting as a backstop for the downward force exerted by the light stick housing spring 603. As the housing spring 603 applies downward pressure on the follower 604, and forcing each subsequent light stick 1002 down toward the light stick ejection port 106, the housing retention walls 609 prevent the bottom most light stick from escaping through bottom of the light stick housing 102, which is also the bottom most portion of the ejection port 106.

The left and right side actuating lever guards 610 serve two purposes. The first purpose is to guide the user's fingers to become properly placed onto the actuating pull pad 611 and, secondly, to form a partial protective barrier on the sides of the actuating pull pad 611 to help prevent accidental or unintentional light stick 1002 activation by the end user, their equipment, or an external environmental obstacle analogous to a trigger guard on a firearm.

The actuating pull pad 611 with pressure from the fingers of the user transfers that pressure to the actuating plunger 612. The light stick ejection port 106 serves as an exit for the bottom most chemical light stick 1002 once it has been activated. The light stick housing rear cover 615 serves to house, protect, and maintain linear order of the chemical light sticks 1002 while under downward pressure from the light stick housing spring 603.

Figure 10:
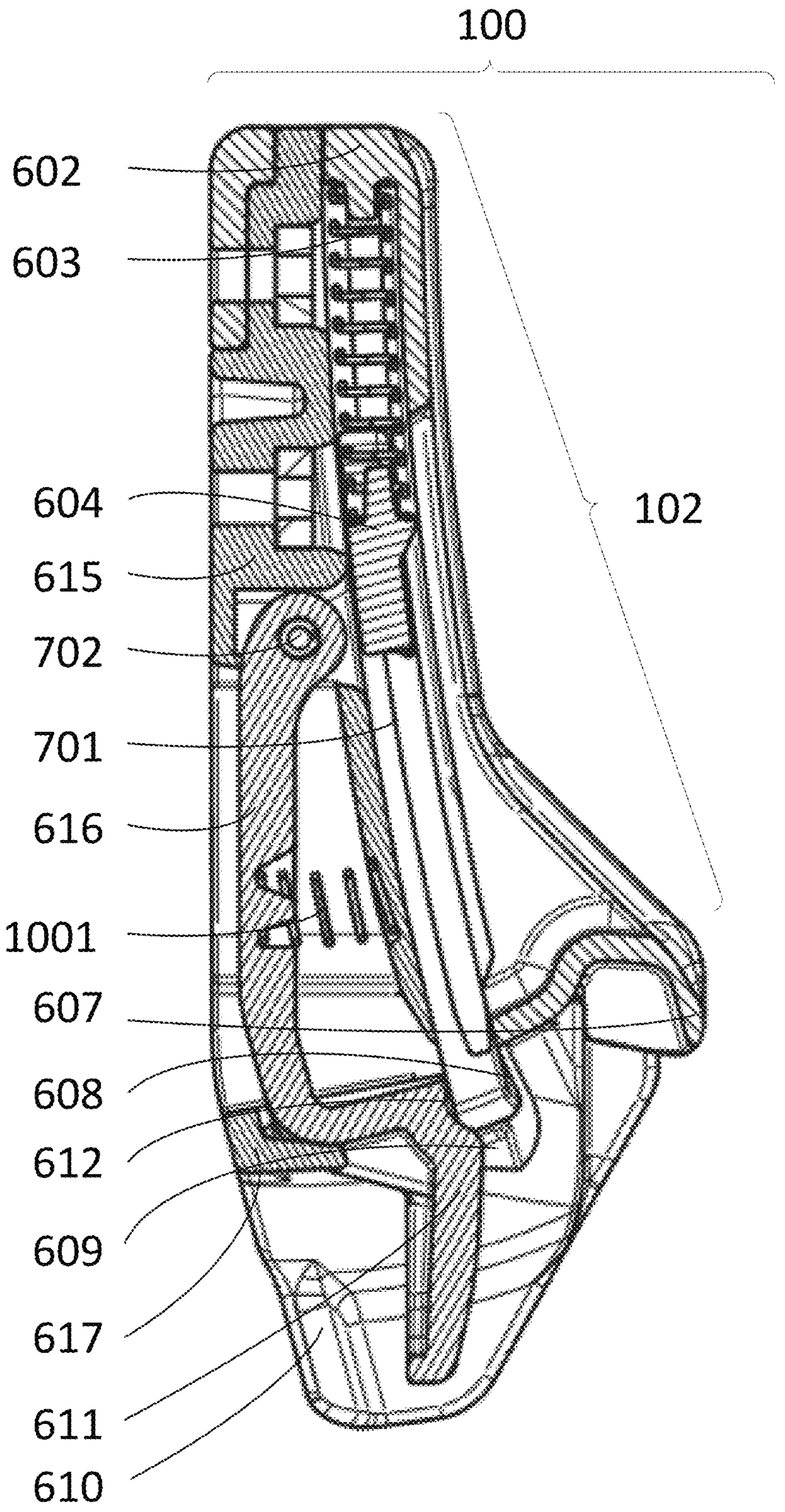
FIG. 10 is a left sectional view of an embodiment of the Tactical Chemical Light Stick Dispenser without light sticks.
Figure 11:
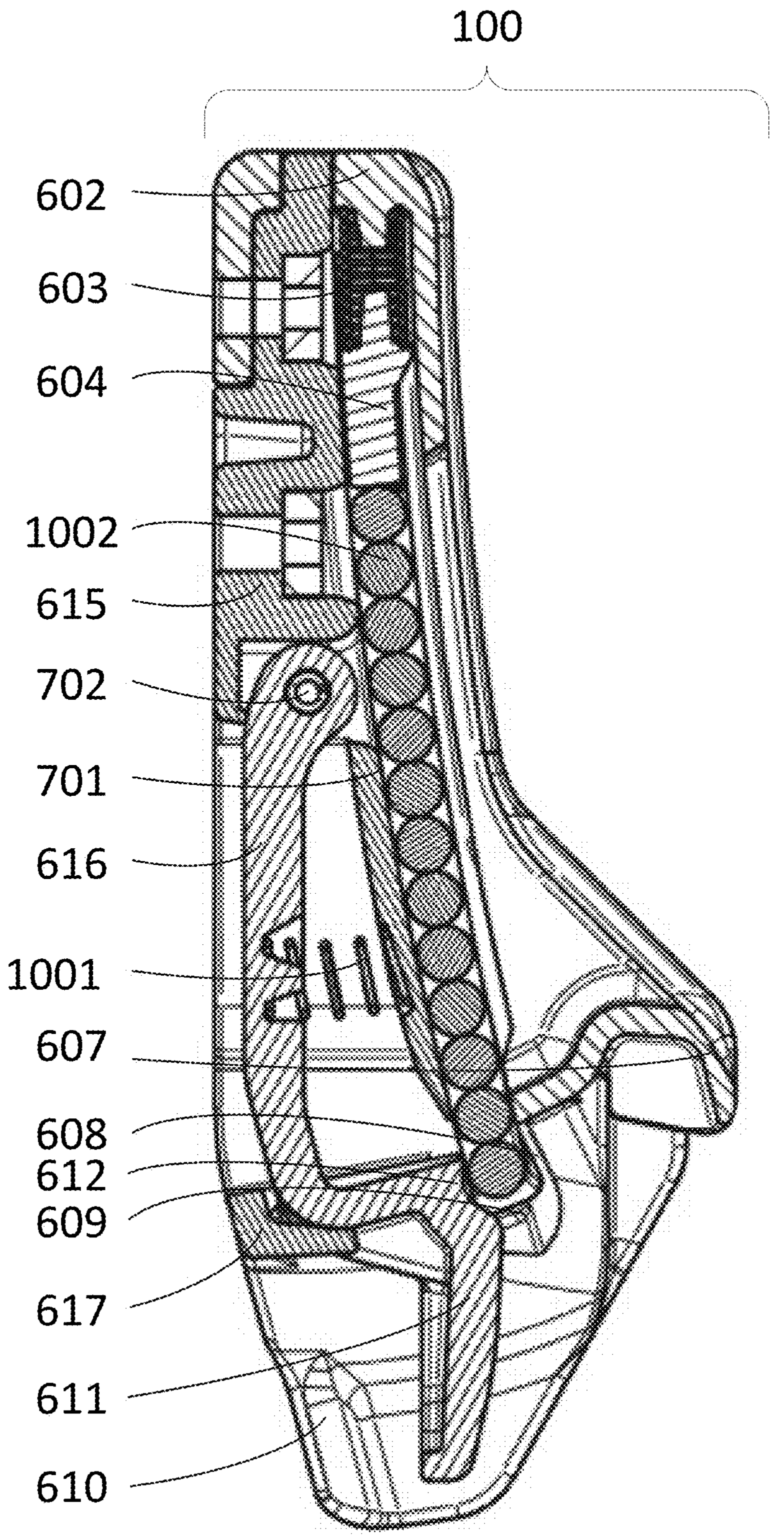
FIG. 11 is a left sectional view of an embodiment of the Tactical Chemical Light Stick Dispenser with light sticks.
Figure 12B:
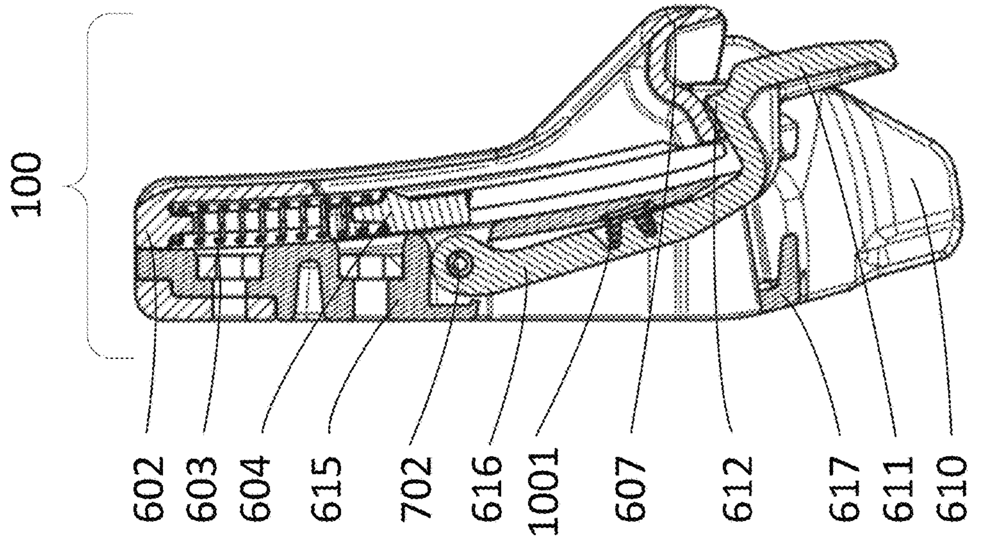
FIG. 12B is a left sectional view of an embodiment of the Tactical Chemical Light Stick Dispenser without light sticks showing the actuation mechanism at its maximum extended position for ejecting an activated light stick.
Figure 12A:
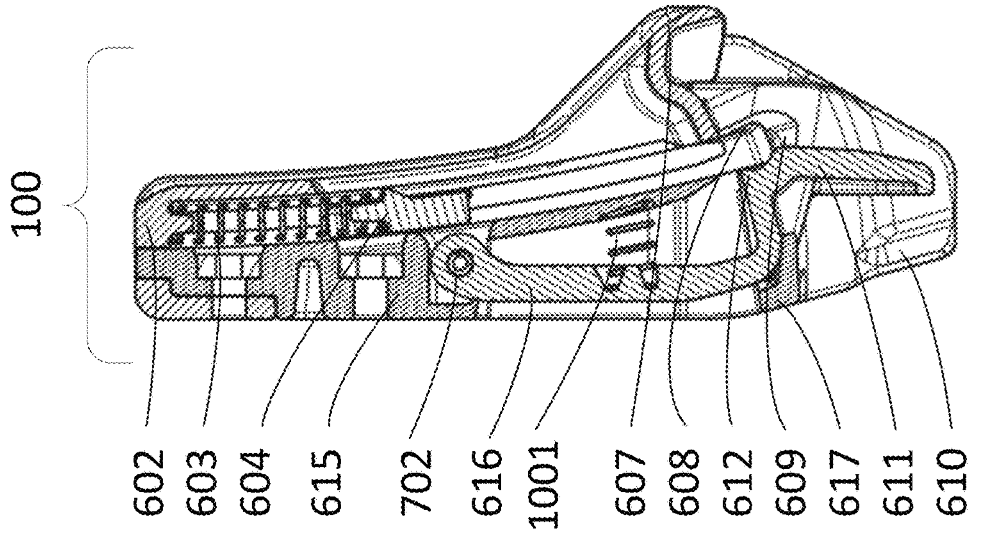
FIG. 12A is a left sectional view of an embodiment of the Tactical Chemical Light Stick Dispenser without light sticks showing the actuation mechanism in the at rest position.
Figure 13C:
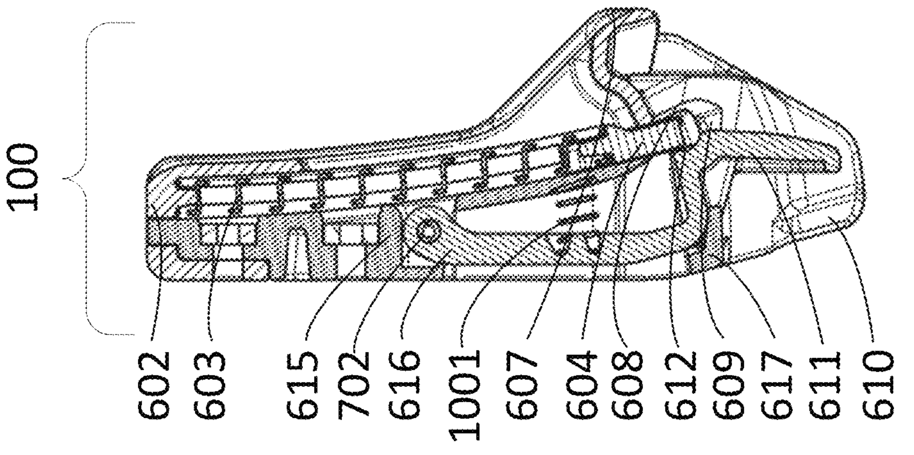
FIG. 13C is a left sectional view of an embodiment of the Tactical Chemical Light Stick Dispenser without light sticks showing the actuation mechanism in the at rest position.
Figure 13B:
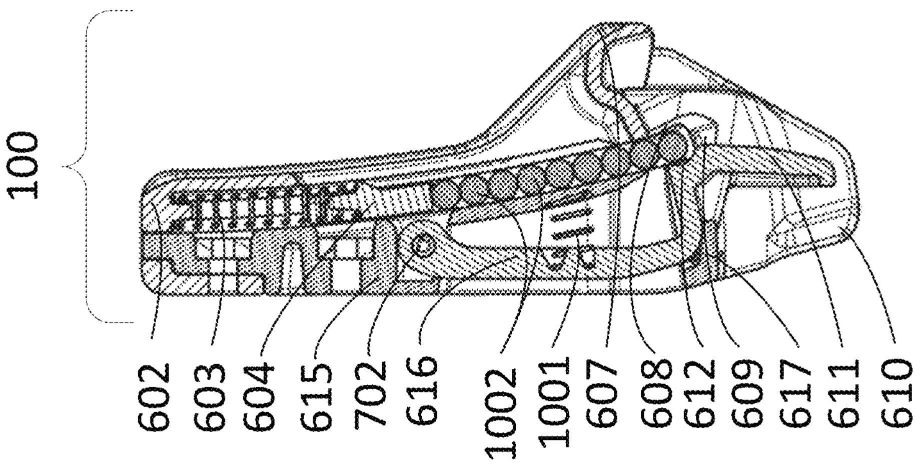
FIG. 13B is a left sectional view of an embodiment of the Tactical Chemical Light Stick Dispenser with a partial complement of light sticks showing the actuation mechanism in the at rest position.
Figure 13A:
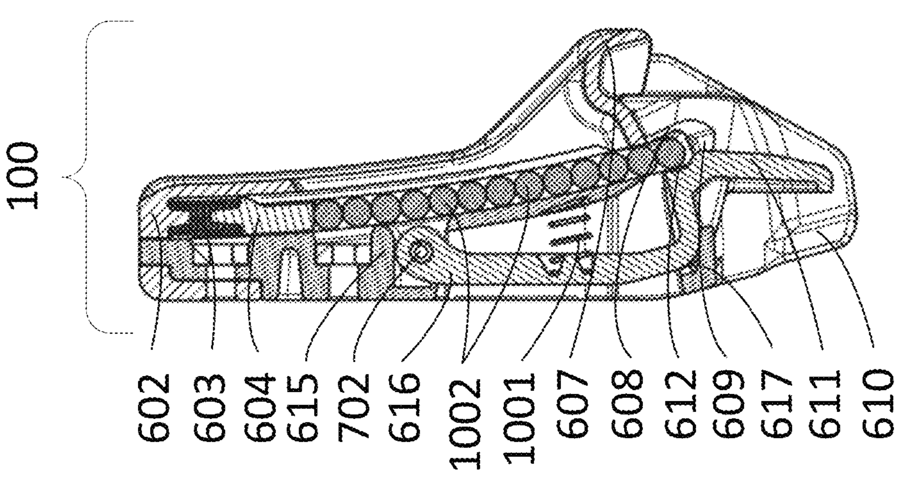
FIG. 13A is a left sectional view of an embodiment of the Tactical Chemical Light Stick Dispenser with a full complement of light sticks showing the actuation mechanism in the at rest position.
Figure 14A:
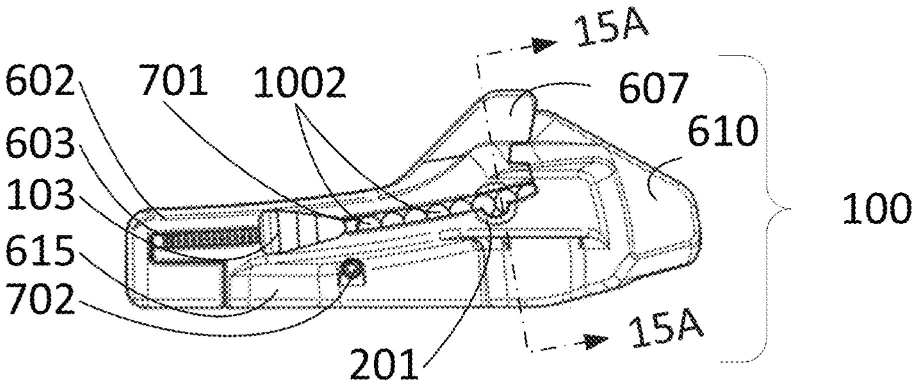
FIG. 14A is a left view of an embodiment of the Tactical Chemical Light Stick Dispenser with a partial complement of light sticks showing the actuation mechanism in the at rest position.
Figure 14B:
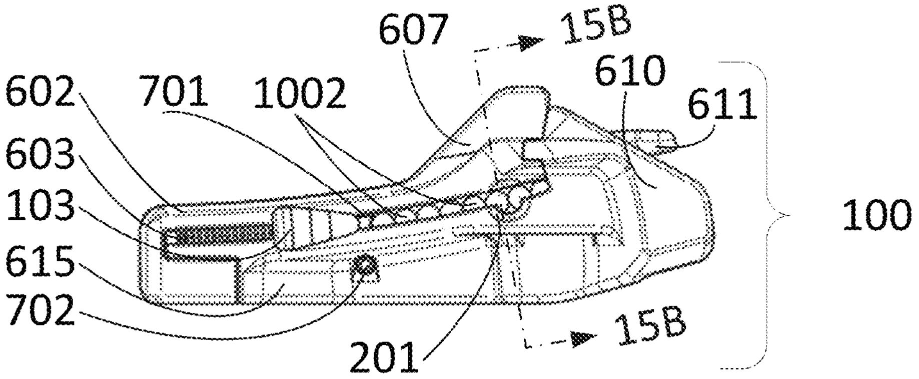
FIG. 14B is a left view of an embodiment of the Tactical Chemical Light Stick Dispenser with a full complement of light sticks showing the actuation mechanism is between the rest and fully extended position for actuation; 14C is a left view of an embodiment of the Tactical Chemical Light Stick Dispenser with a partial complement of light sticks showing the actuation mechanism at the maximum extended position for ejecting an activated light stick.
Figure 14C:
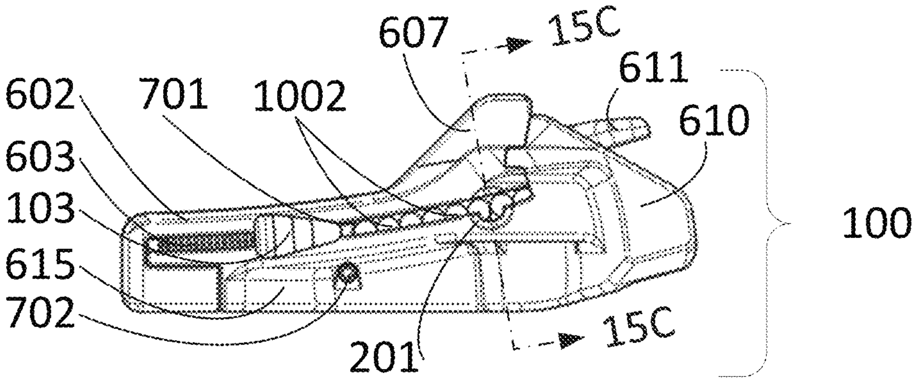
Figure 15A:
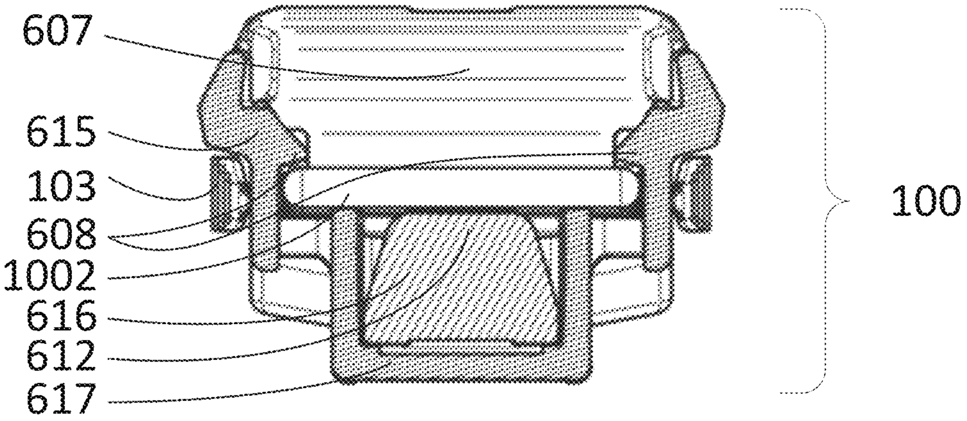
FIG. 15A is a bottom view of an embodiment of the Tactical Chemical Light Stick Dispenser with the bottom most light stick positioned in the ejection port showing the actuation mechanism in the at rest position.
Figure 15B:
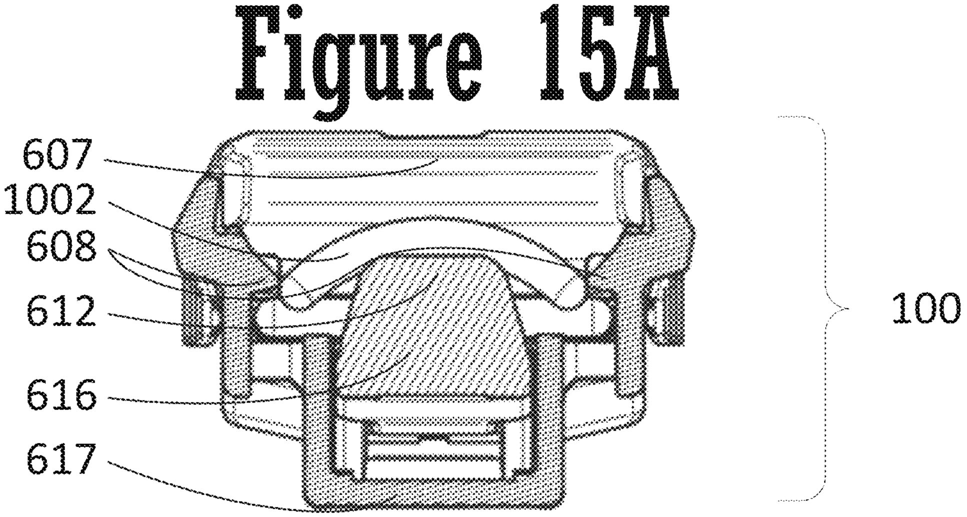
FIG. 15B is a bottom view of an embodiment of the Tactical Chemical Light Stick Dispenser showing the actuation mechanism during the actuation process showing the left and right light stick actuation retention walls retaining the ends of the bottom most light stick and showing the outward pressure caused by the actuating lever forcing a chemical light stick to bend across the actuating plunger.
Figure 15C:
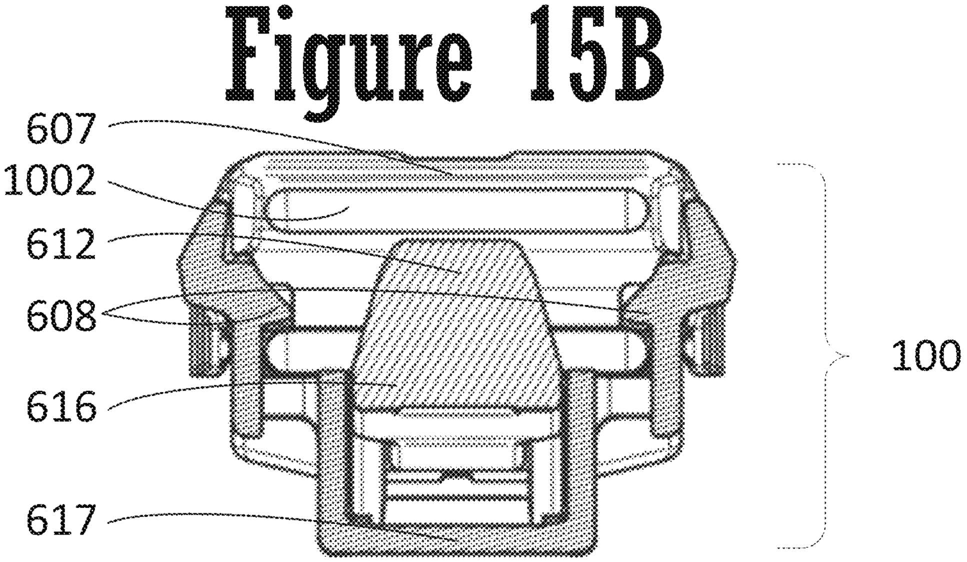
FIG. 15C is a bottom view of an embodiment of the Tactical Chemical Light Stick Dispenser showing the actuation mechanism forcing the light stick out and away from the left and right light stick actuation retention walls toward the ejection port hood, thereby ejecting the bottom most activated light stick from the Tactical Chemical Light Stick Dispenser ejection port.
Figure 16:
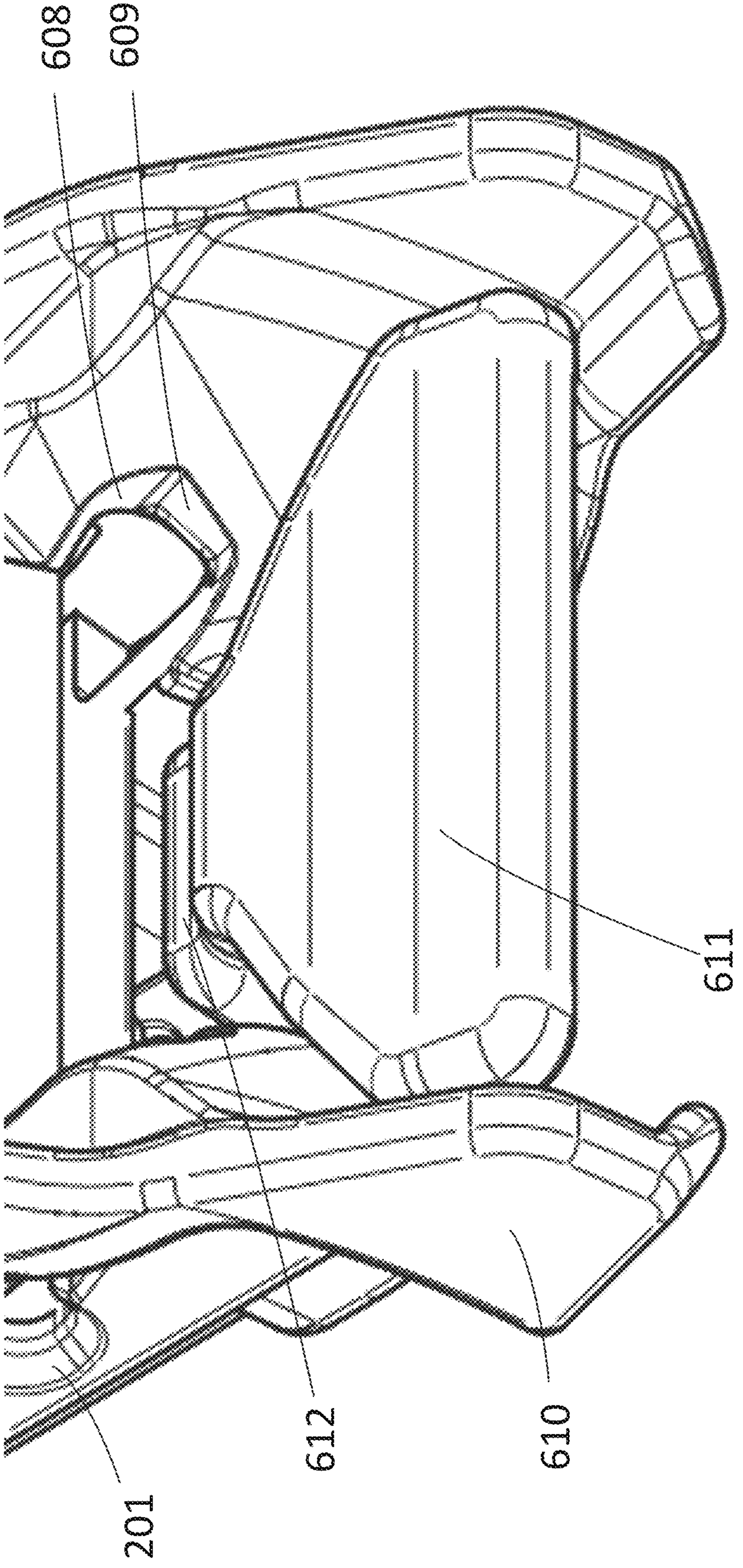
FIG. 16 is a closeup perspective view of an embodiment of the Tactical Chemical Light Stick Dispenser ejection port, the actuation retention walls, the light stick housing retention walls, and the actuation mechanism.

The actuating lever assembly rod channel 614 provides a channel to retain the lever assembly rod 702. The lever assembly rod 702 serves to allow the actuating lever 616 to pivot from the at rest position, see FIG. 14A, to the fully extended actuating position, see FIG. 14C. The actuating lever backstop 617 serves as a stopping feature for the actuating lever 616 when the actuating lever 616 is in the at rest position, see FIG. 10. The follower alignment track 701 guides the light stick housing spring follower 604 and left and right index points 103 downward as the chemical light sticks 1002 are activated and ejected from the Dispenser 100. The light stick loading port 201 allows for loading individual chemical light sticks 1002 into the Dispenser 100.

The chemical light sticks 1002 are loaded into the Dispenser 100 when the user places their fingers on the left and right index points 103 and applies upward pressure toward the top of the chemical light stick housing 102, thereby retracting the follower 604 toward the top of the light stick housing 102. The user then inserts one chemical light stick 1002 at a time into the light stick loading port 201. The chemical light stick 1002 travels through the light stick loading port 201 until it reaches the opposite side of the light stick housing 102. Subsequent light sticks enter through this loading port 201 until the maximum light stick 1002 capacity of the light stick housing 102 is reached. When the user finishes loading light sticks 1002 into the light stick housing 102, the user removes their fingers from the left and right index points 103, allowing the light stick housing spring 603 to exert downward pressure, through the follower 604, then onto the light sticks 1002 positioned inside of the light stick housing 102. The bottom most light stick is then positioned downward against the left and right housing retention walls 609 and ready for the actuation process to begin at the discretion of the user.

When a chemical light stick 1002 is being pressed outward in the center by contact from the actuating plunger 612 from the forward motion of the actuating lever 616 causing the chemical light stick 1002 to bend and flex forward toward the ejection port hood 607, the ends of the chemical light stick 1002 are retained by the chemical light stick actuation retention walls 608 during the actuation process. The ends of the chemical light stick 1002 remain in contact with the actuation retention walls until the internal structure within the chemical light stick 1002 becomes broken. Immediately after the internal structure within the chemical light stick 1002 breaks allowing the internal chemicals to mix and chemically activate, the ends of the chemical light stick 1002 break free from the chemical light stick actuation retention walls 608 and the forward motion of the actuating plunger 612 then ejects the activated chemical light stick 1002 from the dispenser toward the ejection port hood 607, thereby completing the actuation and ejection functions. Upon completion of this mechanical function, forward pressure from the fingers of the user is released from the actuation mechanism allowing the actuating lever 616 to return to the at rest position, terminating its movement once it contacts the actuating lever backstop 617. As the actuating lever 616 returns to the at rest position, the next available chemical light stick 1002 is pushed downward by the pressure from the light stick housing spring 603 into the light stick ejection port 106, where it awaits the initiation of the next actuation cycle. As outward pressure is applied by the user on the actuating pull pad 611, the forward mechanical movement of the actuating lever 616 forces the bottom most chemical light stick 1002 to bend across the actuating plunger 612 causing the chemical light stick 1002 to become bent, breaking the internal structure of the light stick, causing the chemicals in the chemical light stick 1002 to become activated. The bottom most chemical light stick 1002 is activated when it is bent in the middle to cause the chemicals in the chemical light stick 1002 to mix causing a chemical reaction to emit visible wavelengths of light. By bending the chemical light stick 1002 sufficiently, an internal structure of the chemical light stick 1002 is broken thereby activating the chemical light stick 1002 to emit visible wavelengths of light.

The actuating lever 616 is hinged with the light stick housing rear cover 615 by an assembly rod 702 and is contacted with a compression lever spring 1001 keeping the actuating lever open in the normal or at rest position, against the actuating lever backstop 617. The actuating lever 616 has an integrated actuating pull pad 611 for the user's fingers to pull forward on and an integrated actuating plunger 612 that contacts the center of the bottom most chemical light stick 1002 during the actuation process. The actuating lever 616, the actuating pull pad 611, and the actuating plunger 612 are all integrally formed into a single structure.

When the user pulls the actuating pull pad 611 and the hinged actuating lever 616 forward toward the front of the Dispenser 100, it forces the actuating plunger 612 to contact the center of the bottom most chemical light stick 1002 and pushes the center of that chemical light stick 1002 forward toward the light stick ejection port hood 607. As the center of the chemical light stick 1002 is pushed forward, both ends of the chemical light stick 1002 remain secured by the left and right sides of the chemical light stick actuation retention walls 608. Therefore, as the center of the chemical light stick 1002 is pushed forward, both ends of the chemical light stick 1002 remain secured in place by the left and right side light stick actuation walls 608 until the chemical light stick 1002 activates and the ejection phase of the actuation process begins.

Once the internal structure inside the bottom most chemical light stick 1002 is broken and the bottom most chemical light stick 1002 is activated, that chemical light stick 1002 is pushed further forward due to central contact from the actuating plunger 612. The continued actuating forward motion from the actuating plunger 612 then pushes the center of the bottom most chemical light stick 1002 outward enough toward the light stick ejection port 607, causing the chemical light stick 1002 to activate and subsequently break free from the left and right light stick actuation retention walls 608, allowing the chemical light stick 1002 to become ejected outward, with the ejected light stick 1002 making contact with the ejection port hood 607, then dropping into the user's hand. As the chemical light stick 1002 is pushed outward in the center causing it to become curved due to the outward force from the contact made by the actuating plunger 612, which then pushes the chemical light stick 1002 so far forward that the chemical light stick 1002 activates, and breaks free from the left and right side chemical light stick actuation retention walls 608 allowing for the chemical light stick 1002 to become ejected outward, making contact with the ejection port hood 607, then dropping into the user's hand.

What we claimed is:

1. A chemical light stick dispenser comprising a light stick housing comprising front and rear light stick housing covers, loading index points connected to a follower, a light stick housing spring, a light stick status window, a light stick loading port, a light stick ejection port located at the bottom of the dispenser housing, a light stick ejection port hood, an actuating lever comprising an actuating pull pad and an actuating plunger, an actuating lever spring, left and right actuating lever guards, left and right light stick housing retention walls, left and right light stick actuation retention walls wherein, while the left and right light stick actuation retention walls retain the ends of the bottom most light stick, the outward pressure caused by depressing the actuating lever forces the bottom most chemical light stick to bend across the actuating plunger causing that chemical light stick to become bent and the chemicals in that light stick to become activated.

2. The chemical light stick dispenser described in claim 1 comprising within the dispenser housing a chemical light stick housing spring, a follower, a chemical light stick housing loading port.

3. The chemical light stick dispenser described in claim 1 comprising one side of the dispenser housing forms a chemical light stick status window that permits viewing of the number of remaining chemical light sticks for activation and ejection.

4. The chemical light dispenser described in claim 1 comprising the chemical light stick housing spring maintaining downward pressure on the follower, which in turn, applies downward pressure on the chemical light sticks in the dispenser that holds all of the light sticks in place down the dispenser housing all the way to the light stick ejection port and wherein the left and right light stick housing retention walls retain the light sticks in place down the dispenser housing to the chemical light stick ejection port.

5. The chemical light stick dispenser described in claim 1 comprising the actuating lever forces the bottom most chemical light stick to activate and eject from the ejection port outward toward the ejection port hood then into the hand of the user and the actuating lever spring restores the actuating lever back to the original at rest position against the actuating lever backstop.

6. The chemical light stick dispenser described in claim 1 comprising a light stick loading port, the actuating lever is connected to and transitions into the actuating plunger which in turn is connected to and transitions into an actuating pull pad, and one actuating lever spring maintains pressure on the actuating lever against the actuating lever backstop at the rest position.

7. The chemical light stick dispenser described in claim 2 comprising within the dispenser housing a chemical light stick housing spring, a follower, and a chemical light stick housing loading port.

8. The chemical light stick dispenser described in claim 7 comprising one side of the dispenser housing forms a chemical light stick status window that permits viewing the number of remaining chemical light sticks for activation and ejection.

9. The chemical light stick dispenser described in claim 8 comprising the chemical light stick housing spring exerts downward pressure on the chemical light sticks in the dispenser housing and provides adequate force to hold the bottom most chemical light stick against the housing retention walls on the left and right sides of the ejection port, until the actuation process begins movement toward activating and ejecting the bottom most chemical light stick.

10. The chemical light stick dispenser described in claim 9 comprising the chemical light stick housing spring maintains downward pressure on the follower, which in turn, applies downward pressure on the chemical light sticks in the dispenser housing wherein the left and right light stick housing retention walls retain the bottom most light stick, thus holding all of the light sticks in place down the dispenser housing to the chemical light stick ejection port.

11. The chemical light stick dispenser described in claim 10 comprising the actuating lever forcing the bottom most chemical light stick to eject from the ejection port outward toward the ejection port hood then into the hand of the user and the actuating lever spring restoring the actuating lever back to its original at rest position against the actuating lever backstop.

* * * * *